United States Patent
Nakatani

(10) Patent No.: US 8,387,459 B2
(45) Date of Patent: Mar. 5, 2013

(54) MEMS SENSOR

(75) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 698 days.

(21) Appl. No.: 12/606,606

(22) Filed: Oct. 27, 2009

(65) Prior Publication Data

US 2010/0101324 A1    Apr. 29, 2010

(30) Foreign Application Priority Data

Oct. 28, 2008    (JP) .................................. 2008-277134

(51) Int. Cl.
*G01P 15/12*    (2006.01)
(52) U.S. Cl. .................................................. 73/514.33
(58) Field of Classification Search ............... 73/514.33, 73/514.38
See application file for complete search history.

(56) References Cited

U.S. PATENT DOCUMENTS

| | | | | |
|---|---|---|---|---|
| 5,352,635 A | * | 10/1994 | Tu et al. | 438/53 |
| 6,772,632 B2 | * | 8/2004 | Okada | 73/514.33 |
| 2005/0217373 A1 | | 10/2005 | Ishikawa et al. | |

FOREIGN PATENT DOCUMENTS

JP    2005-283393 A    10/2005

* cited by examiner

*Primary Examiner* — John Chapman, Jr.
(74) *Attorney, Agent, or Firm* — Rabin & Berdo, P.C.

(57) ABSTRACT

The MEMS sensor according to the present invention includes: a substrate; a supporting portion provided on one surface of the substrate; a beam, supported by the supporting portion, having a movable portion opposed to the surface of the substrate through a space; a resistor formed on at least the movable portion of the beam; a weight arranged on a side of the beam opposite to the substrate; and a coupling portion, made of a metallic material, coupling the beam and the weight with each other.

5 Claims, 7 Drawing Sheets

MEMS SENSOR

BACKGROUND OF THE INVENTION

1. Field of the Invention

The present invention relates to a sensor (an MEMS sensor) manufactured by an MEMS (Micro Electro Mechanical Systems) technique.

2. Description of Related Art

An MEMS sensor, having been recently loaded on a portable telephone or the like, is increasingly watched with interest. For example, a piezoresistive acceleration sensor for detecting the acceleration of a substance is known as a typical MEMS sensor.

A conventional piezoresistive acceleration sensor includes a frame in the form of a quadrilateral frame, a beam supported by the frame, and four weights supported by the beam. The beam is cruciform in plan view, and extended between central portions of the respective sides of the frame. Piezoresistive elements and wires are provided on the beam. The weights, provided on four regions partitioned by the frame and the beam, are in the form of quadrilateral poles having a thickness generally identical to that of the frame. One corner portion of each weight arranged closer to the central side of the frame is connected to the cross portion (the central portion) of the beam while the remaining portions are separated from the frame and the beam, so that the weight is supported by the beam in a vibratile manner.

When acceleration acts on the piezoresistive acceleration sensor and the weights are vibrated, the beam is distorted. Thus, stress is applied to the piezoresistive elements provided on the beam, to change the resistance values thereof. When the quantity of the change in the resistance value of each piezoresistive element is extracted as a signal, therefore, the acceleration acting on the piezoresistive acceleration sensor can be detected on the basis of the signal.

The piezoresistive acceleration sensor having the aforementioned structure is manufactured by employing an SOI substrate having a multilayer structure of a silicon base layer having a thickness of 400 μm, a silicon oxide layer having a thickness of 1 μm and a silicon surface layer having a thickness of 7 μm, for example. In the steps of manufacturing the piezoresistive acceleration sensor, the silicon surface layer is first selectively etched with the silicon oxide layer serving as an etching stopper, so that surface-side grooves surrounding portions for forming the weights respectively are formed in the silicon surface layer. Then, the silicon base layer is etched with the silicon oxide layer serving as an etching stopper while leaving portions for forming the frame and the weights, so that rear-side grooves are formed in the silicon surface layer. Then, portions of the silicon oxide layer exposed through the rear-side grooves are etched, whereby the frame and the weights are separated from one another, and the piezoresistive acceleration sensor is obtained.

In order to separate the frame and the weights from one another, however, the steps of forming the surface-side grooves and the rear-side grooves must be separately carried out, to disadvantageously require a long time for manufacturing the piezoresistive acceleration sensor. Further, the silicon base layer having a relatively large thickness must be etched over the thickness direction thereof in order to form the rear-side grooves, and the etching (formation of the rear-side grooves) also requires a long time.

SUMMARY OF THE INVENTION

An object of the present invention is to provide an MEMS sensor allowing reduction of the time required for manufacturing the same.

An MEMS sensor according to an aspect of the present invention includes: a substrate; a supporting portion provided on one surface of the substrate; a beam, supported by the supporting portion, having a movable portion opposed to the surface of the substrate through a space; a resistor formed on at least the movable portion of the beam; a weight arranged on a side of the beam opposite to the substrate; and a coupling portion, made of a metallic material, coupling the beam and the weight with each other.

In the MEMS sensor, the supporting portion provided on one surface of the substrate supports the beam having the movable portion opposed to the surface of the substrate through the space. The resistor is formed on at least the movable portion of the beam. The weight is coupled to the beam through the coupling portion. When the weight is vibrated, therefore, the movable portion is distorted (twisted and/or deflected). The resistor formed on the beam is expanded/contracted due to the distortion of the movable portion, to change the resistance value thereof. When the change in the resistance value is extracted as a signal, the physical quantities (the direct ion and the magnitude of the acceleration, for example) acting on the weight can be detected on the basis of the signal (the change of the resistance value).

The MEMS sensor having the aforementioned structure can be obtained by forming the supporting portion and the beam having the resistor on the substrate, thereafter bonding a second substrate serving as the base of the weight to the beam through the coupling portion made of the metallic material, and working the second substrate into the weight by selective etching. In order to form the weight, therefore, no etching is required for forming a surface-side groove and a rear-side groove, dissimilarly to the steps of manufacturing the conventional acceleration sensor. Thus, the time required for manufacturing the MEMS sensor can be reduced.

The coupling portion is preferably made of a material containing either Au (gold) or Cu (copper) and Sn (tin). When bumps made of Au or Cu are formed on the beam and the weight respectively and the bumps of the beam and the weight are butted each other while a metallic material (solder, for example) containing Sn is interposed therebetween as an adhesive, for example, the coupling portion consisting of the bumps and the adhesive can be formed. In this case, the beam and the weight can be strongly coupled with each other due to eutectic bonding between Au or Cu and Sn on the interfaces between the bumps and the adhesive.

The material for the weight may be Si (silicon).

The supporting portion may include an insulating layer formed on the surface of the substrate and a semiconductor layer stacked on the insulating layer, and the movable portion may include a second semiconductor layer connected with the semiconductor layer to form a single layer with the semiconductor layer.

In this case, a wire can be formed on the movable portion by selectively doping the second semiconductor layer with an impurity. Further, the resistor, which is a diffusion resistor, can be formed by doping an intermediate portion of the wire with the impurity in a lower concentration than the impurity concentration in the wire.

The supporting portion may be in the form of a quadrilateral ring along the peripheral edge of the substrate in plan view, and the beam may be arranged inside the supporting portion, to be cruciform in plan view.

The foregoing and other objects, features and effects of the present invention will become more apparent from the following detailed description of the embodiments with reference to the attached drawings.

DETAILED DESCRIPTION OF PREFERRED EMBODIMENTS

Figure 1A:
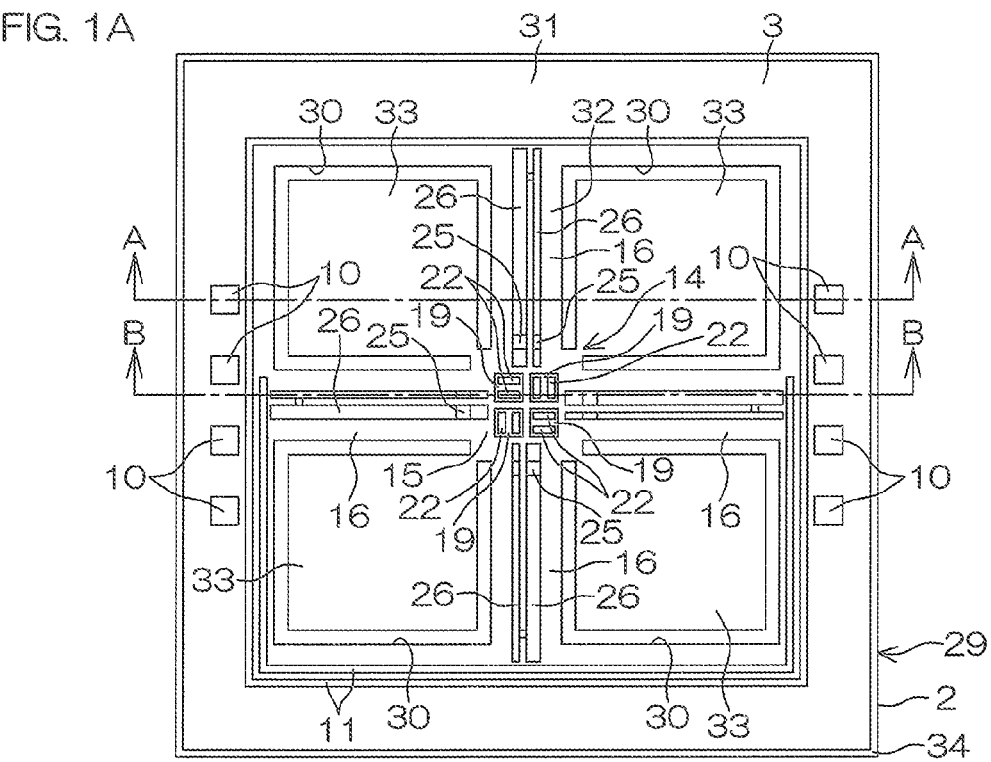
FIG. 1A is a schematic plan view of an acceleration sensor according to an embodiment of the present invention.
Figure 1B:
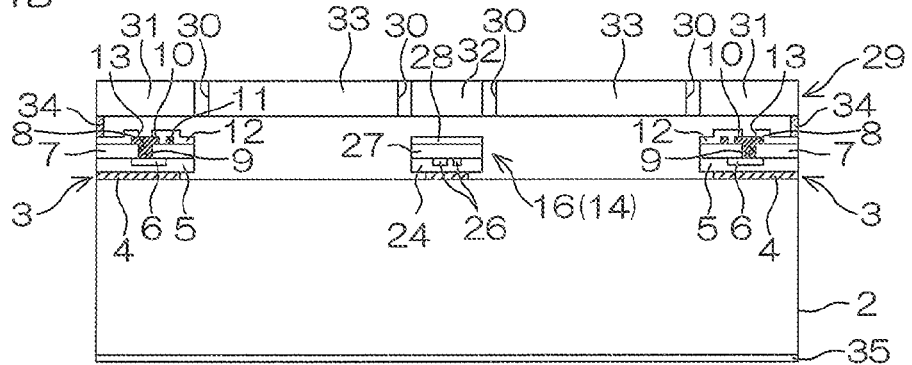
FIG. 1B is a sectional view of the acceleration sensor taken along a line A-A shown in FIG. 1A.
Figure 1C:
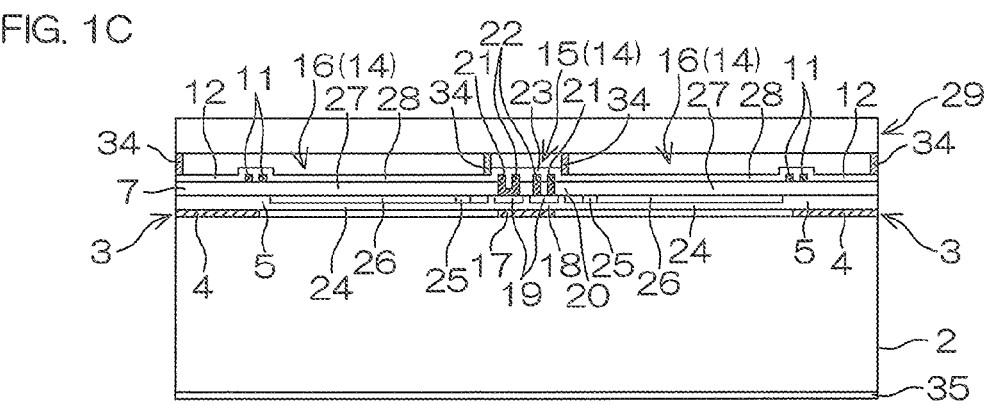
FIG. 1C is a sectional view of the acceleration sensor taken along a line B-B shown in FIG. 1A.

FIG. 1A is a schematic plan view of an acceleration sensor according to an embodiment of the present invention. FIG. 1B is a sectional view of the acceleration sensor taken along a line A-A shown in FIG. 1A. FIG. 1C is a sectional view of the acceleration sensor taken along a line B-B shown in FIG. 1A.

An acceleration sensor 1 is a sensor (an MEMS sensor) manufactured by the MEMS technique.

The acceleration sensor 1 includes a substrate 2 made of Si as a base thereof. The substrate 2 is quadrilateral in plan view and has a thickness of 400 µm, for example.

A supporting portion 3 is formed on the surface of the substrate 2. The supporting portion 3 is in the form of a quadrilateral ring (a quadrilateral frame) along the peripheral edge of the substrate 2. The supporting portion 3 has a structure obtained by stacking an insulating layer 4 made of $SiO_2$ (silicon oxide) and a semiconductor layer 5 made of Si in this order on the surface of the substrate 2, as shown in FIGS. 1B and 1C. The insulating layer 4 has a thickness of 5000 Å (=0.5 µm), for example. The semiconductor layer 5 has a thickness of 7 µm, for example.

A plurality of wires 6 are formed on a surface layer portion of the semiconductor layer 5 by selectively doping the surface layer portion with an impurity (P (phosphorus) ions, for example), as shown in FIG. 1B.

An interlayer dielectric film 7 made of $SiO_2$ is formed on the semiconductor layer 5. The interlayer dielectric film 7 has a thickness of 5000 Å, for example. A plurality of contact holes 8 are formed in the interlayer dielectric film 7 to penetrate the same. Each contact hole 8 is formed on a position opposed to any wire 6. Contact plugs 9 made of Al (aluminum) are embedded in the contact holes 8 respectively. Pads 10 made of Al are formed on the interlayer dielectric film 7 integrally with the contact plugs 9 respectively. Further, metal wires 11 made of Al are formed on the interlayer dielectric film 7. A passivation film 12 made of SiN (silicon nitride) is stacked on the interlayer dielectric film 7. The passivation film 12 has a thickness of 12000 Å (=1.2 µm), for example. Openings 13 for exposing the pads 10 respectively are formed in the passivation film 12.

A beam 14 is provided on the surface of the substrate 2 inside the supporting portion 3, as shown in FIG. 1A. The beam 14 is cruciform in plan view, and includes a cross portion 15 arranged on a central portion of the surface of the substrate 2 and movable portions 16 extending from the cross portion 15 toward central portions of the respective sides of the supporting portion 3.

The cross portion 15 has a structure obtained by stacking an insulating layer 17 made of $SiO_2$ and a semiconductor layer 18 made of Si in this order on the surface of the substrate 2, as shown in FIGS. 1B and 1C. The insulating layer 17 is an identical layer formed simultaneously with the insulating layer 4. The semiconductor layer 18 is an identical layer formed simultaneously with the semiconductor layer 5.

A plurality of impurity diffusion regions 19 are formed on a surface layer portion of the semiconductor layer 18.

An interlayer dielectric film 20 made of $SiO_2$ is stacked on the semiconductor layer 18. The interlayer dielectric film 20 is an identical layer formed simultaneously with the interlayer dielectric film 7. A plurality of contact holes 21 are formed in the interlayer dielectric film 20 to penetrate the same. Each contact hole 21 is formed on a position opposed to any impurity diffusion region 19. Contact plugs 22 made of Al are embedded in the contact holes 21 respectively. A passivation film 23 made of SiN is stacked on the interlayer dielectric film 20. The passivation film 23 is an identical layer formed simultaneously with the passivation film 12.

Each movable portion 16 includes a semiconductor layer 24 made of Si, as shown in FIG. 1C. An end of the semiconductor layer 24 in the longitudinal direction is connected to the semiconductor layer 5 of the supporting portion 3, while another end opposite thereto is connected to the semiconductor layer 18 of the cross portion 15. In other words, the semiconductor layer 24 of each movable portion 16 is an identical layer formed simultaneously with the semiconductor layer 5 of the supporting portion 3 and the semiconductor layer 18 of the cross portion 15. Therefore, each movable portion 16 is opposed to the surface of the substrate 2 through a space of an interval identical to the thickness of the insulating layers 4 and 17.

A plurality of resistors 25 and a plurality of wires 26 are formed on the semiconductor layer 24 by selectively doping the same with an impurity. The resistors 25 are formed by doping intermediate portions of the wires 26 with the impurity in a lower concentration than the impurity concentration in the wires 26. The wires 26 are connected with the wires 6 formed on the supporting portion 3 and/or the impurity diffusion regions 19 formed on the cross portion 15, to constitute a circuit outputting a signal responsive to changes of the resistance values of the resistors 25.

An interlayer dielectric film 27 made of $SiO_2$ is stacked on the semiconductor layer 24. The interlayer dielectric film 27 is an identical layer formed simultaneously with the interlayer dielectric films 7 and 20, and integrated with the interlayer dielectric films 7 and 20. A passivation film 28 made of SiN is stacked on the interlayer dielectric film 27. The passivation film 28 is an identical layer formed simultaneously with the passivation films 12 and 23, and integrated with the passivation films 12 and 23.

A weight structure 29 made of Si is arranged above the supporting portion 3 and the beam 14. The weight structure 29 has an outer shape identical to that of the substrate 2 in plan view and is in the form of a quadrilateral flat plate as a whole, as shown in FIG. 1A. Four through-grooves 30 are formed in the weight structure 29 along the peripheral edges of respective quadrilateral regions partitioned by the supporting portion 3 and the beam 14 in plan view, to penetrate the weight structure 29 in the thickness direction. Each through-groove 30 is generally in the form of a quadrilateral ring discontinuous on a central portion of the weight structure 29. Thus, the weight structure 29 integrally includes a frame portion 31 in the form of a quadrilateral ring (a quadrilateral frame) in plan view, an extended portion 32, cruciform in plan view, having forward ends connected to central portions of the respective sides of the frame portion 31, and weights 33 arranged on regions partitioned by the frame portion 31 and the extended portion 32 so that single corner portions thereof are connected to the extended portion 32, as shown in FIGS. 1A and 1B. Portions of the weights 33 other than the single corner portions are separated from the frame portion 31 and the extended portion 32 by the through-grooves 30.

The weight structure 29 is coupled to the supporting portion 3 and the beam 14 by two coupling portions 34, as shown in FIGS. 1B and 1C. More specifically, one of the coupling portions 34 in the form of a quadrilateral ring is formed between the supporting portion 3 and the frame portion 31 of the weight structure 29 along the outer peripheral edges thereof. The other coupling portion 34 in the form of a quadrilateral ring is formed between the cross portion 15 of the beam 14 and a central portion of the extended portion 32. Thus, the frame portion 31 of the weight structure 29 is supported by the supporting portion 3 through one of the coupling portions 34, and the extended portion 32 of the weight structure 29 is supported by the cross portion 15 of the beam 14 through the other coupling portion 34. In the weight structure 29, further, the four weights 33 are supported by the extended portion 32. The coupling portions 34 are made of a metallic material containing either Au or Cu and Sn.

A silicon oxide film (an $SiO_2$ film) 35 is formed on the rear surface of the substrate 2.

When acceleration acts on the acceleration sensor 1 and the weights 33 are vibrated, the vibration is transmitted to the cross portion 15 of the beam 14 through the extended portion 32 and the coupling portions 34. Thus, the movable portions 16 of the beam 14 are distorted (twisted and/or deflected). The resistance values of the resistors 25 formed on the movable portions 16 change due to the distortion of the movable portions 16. The signal (current) flowing through the wires 6 and 26 in response to the changes of the resistance values of the resistors 25 is extracted through the pads 10, so that the directions (triaxial directions) and the magnitude of the acceleration acting on the weights 33 (the acceleration sensor 1) can be detected.

Referring to FIG. 1A, portions provided under the weight structure 29 are shown through the weight structure 29 if necessary, in order to facilitate easy understanding of the structure of the acceleration sensor 1.

FIGS. 2A to 7A are schematic plan views successively showing the steps of manufacturing the acceleration sensor 1.

FIGS. 2B to 7B are schematic sectional views taken along lines A-A shown in FIGS. 2A to 7A respectively. FIGS. 2C to 7C are schematic sectional views taken along lines B-B shown in FIGS. 2A to 7A respectively.

Figure 2A:
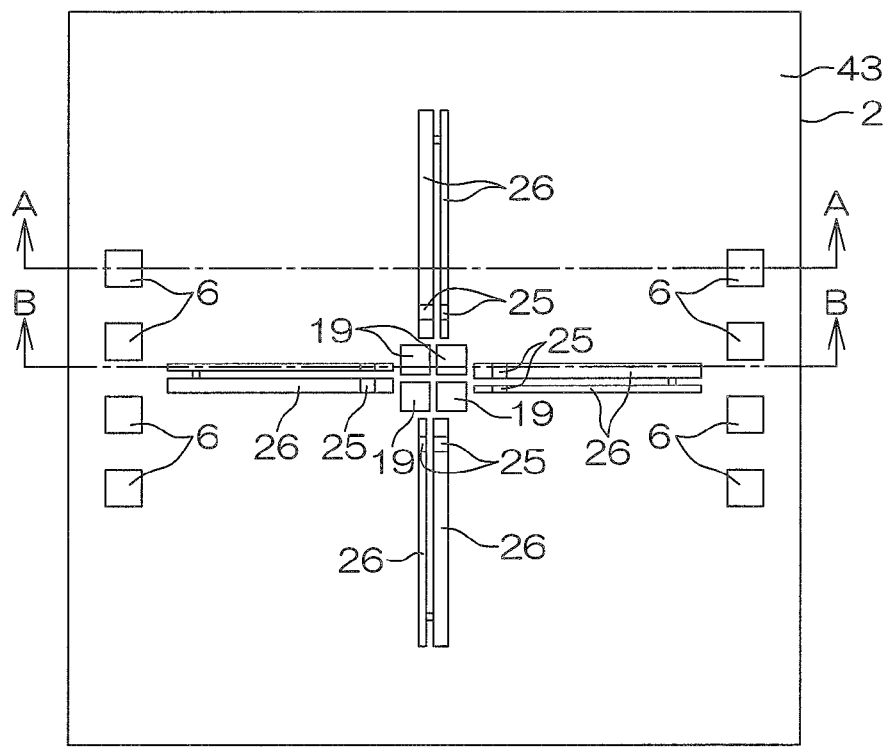
FIG. 2A is a schematic plan view showing a step of manufacturing the acceleration sensor.
Figure 2B:
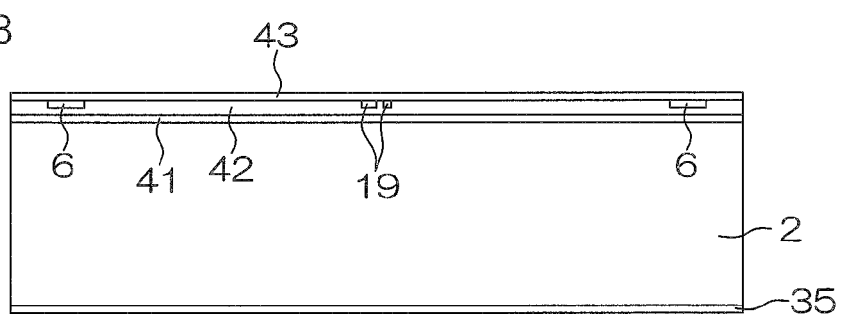
FIG. 2B is a schematic sectional view taken along a line A-A shown in FIG. 2A.
Figure 2C:
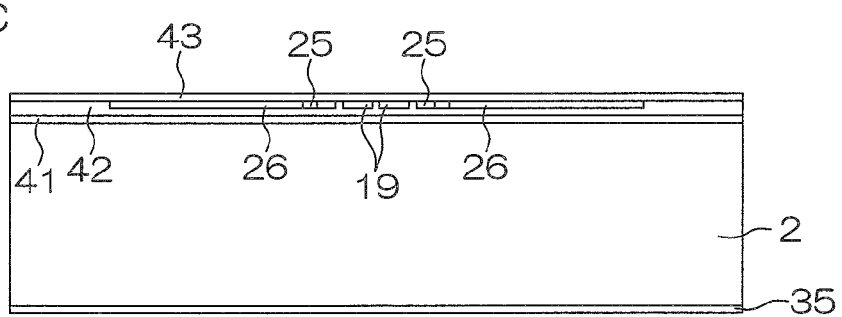
FIG. 2C is a schematic sectional view taken along a line B-B shown in FIG. 2A.

In the steps of manufacturing the acceleration sensor 1, an SOI substrate (a wafer) is prepared by stacking an active layer 42 made of Si on the surface of the substrate 2 through a BOX layer 41 made of SiO.sub.2, as shown in FIGS. 2A, 2B and 2C. Then, the silicon oxide film 35 and a silicon oxide film (an SiO.sub.2 film) 43 are formed on the rear surface of the substrate 2 and the surface of the active layer 42 respectively by thermal oxidation. Thereafter an impurity is selectively implanted into the active layer 42 by ion implantation. Then, a heat treatment is performed for activating the impurity. Thus, the wires 6 and 26, the impurity diffusion regions 19 and the resistors 25 are formed in the active layer 42. Further, the thickness of the silicon oxide film 43 is increased.

Figure 3A:
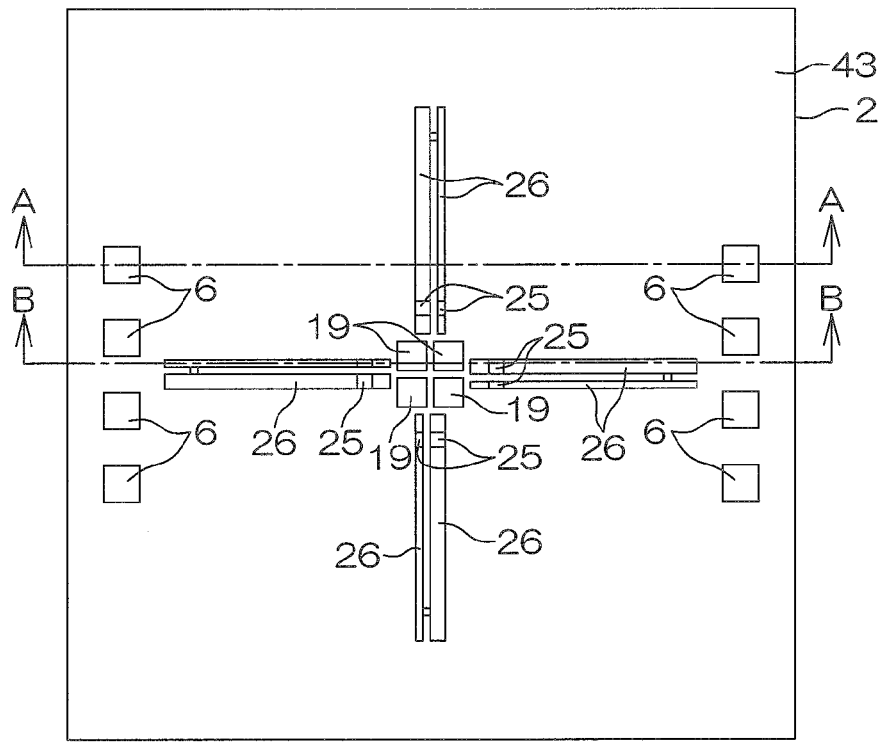
FIG. 3A is a schematic plan view showing a step subsequent to the step shown in FIG. 2A.
Figure 3B:
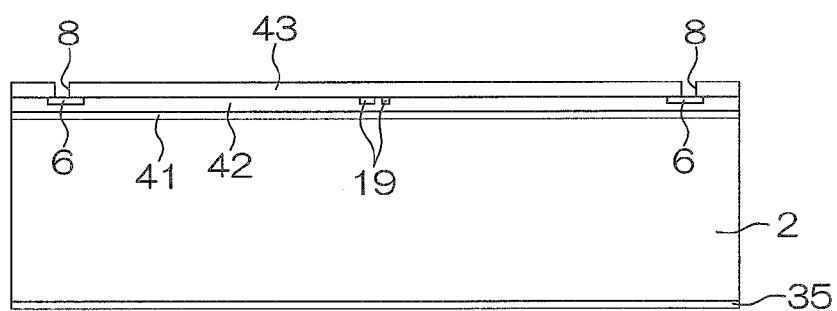
FIG. 3B is a schematic sectional view taken along a line A-A shown in FIG. 3A.
Figure 3C:
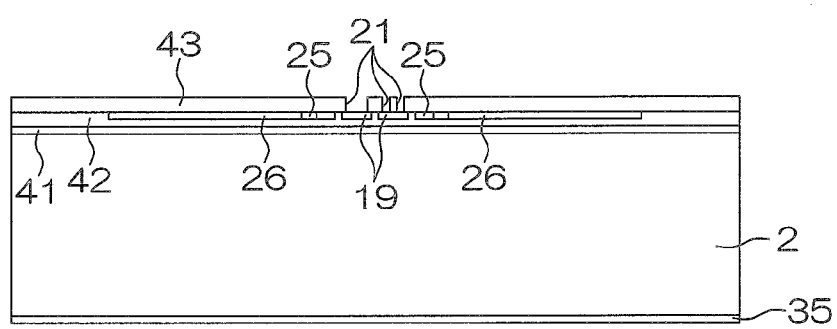
FIG. 3C is a schematic sectional view taken along a line B-B shown in FIG. 3A.

Then, the contact holes 8 and 21 are formed in the silicon oxide film 43 by photolithography and etching, as shown in FIGS. 3A, 3B and 3C.

Figure 4A:
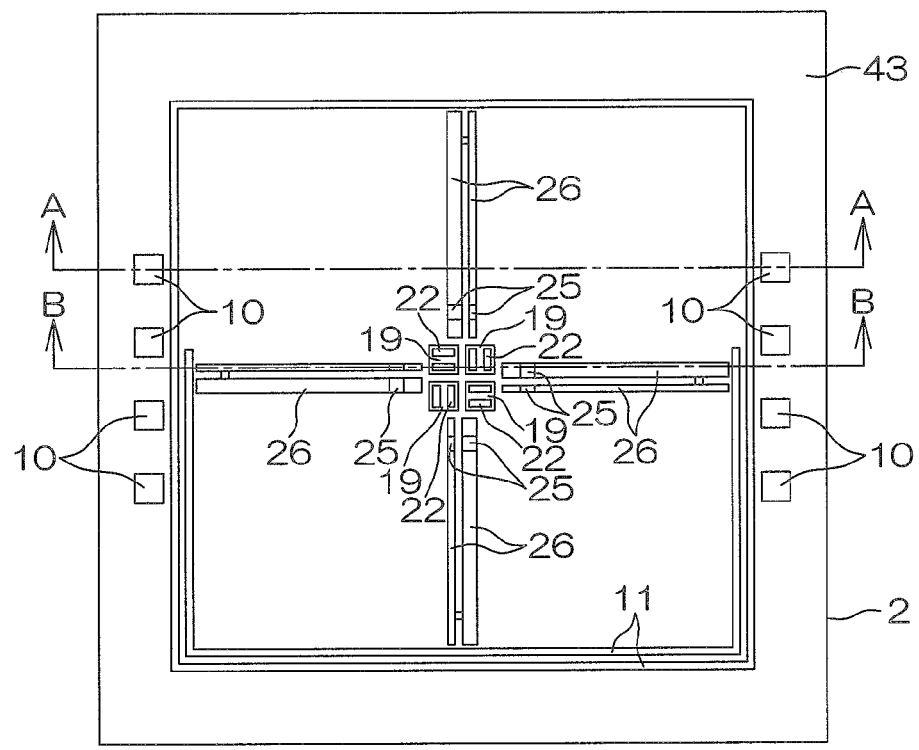
FIG. 4A is a schematic plan view showing a step subsequent to the step shown in FIG. 3A.
Figure 4B:
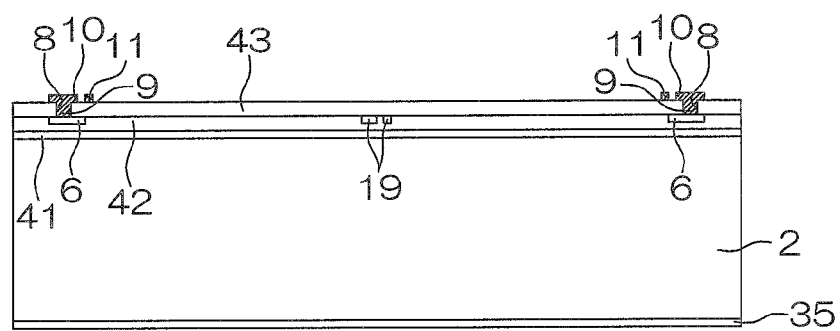
FIG. 4B is a schematic sectional view taken along a line A-A shown in FIG. 4A.
Figure 4C:
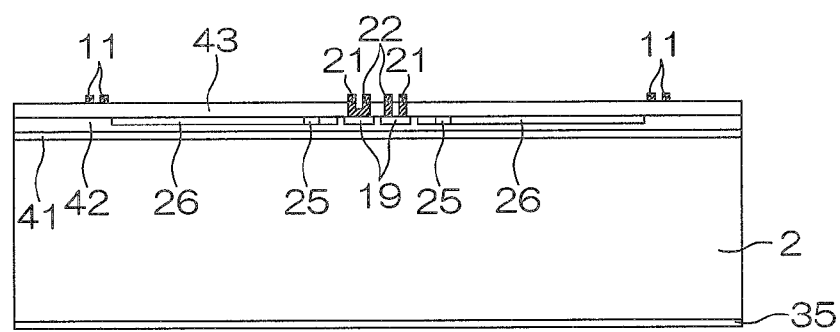
FIG. 4C is a schematic sectional view taken along a line B-B shown in FIG. 4A.

Thereafter the contact plugs 9 and 22, the pads 10 and the metal wires 11 are formed in the contact holes 8 and 21 respectively by sputtering, as shown in FIGS. 4A, 4B and 4C.

Figure 5A:
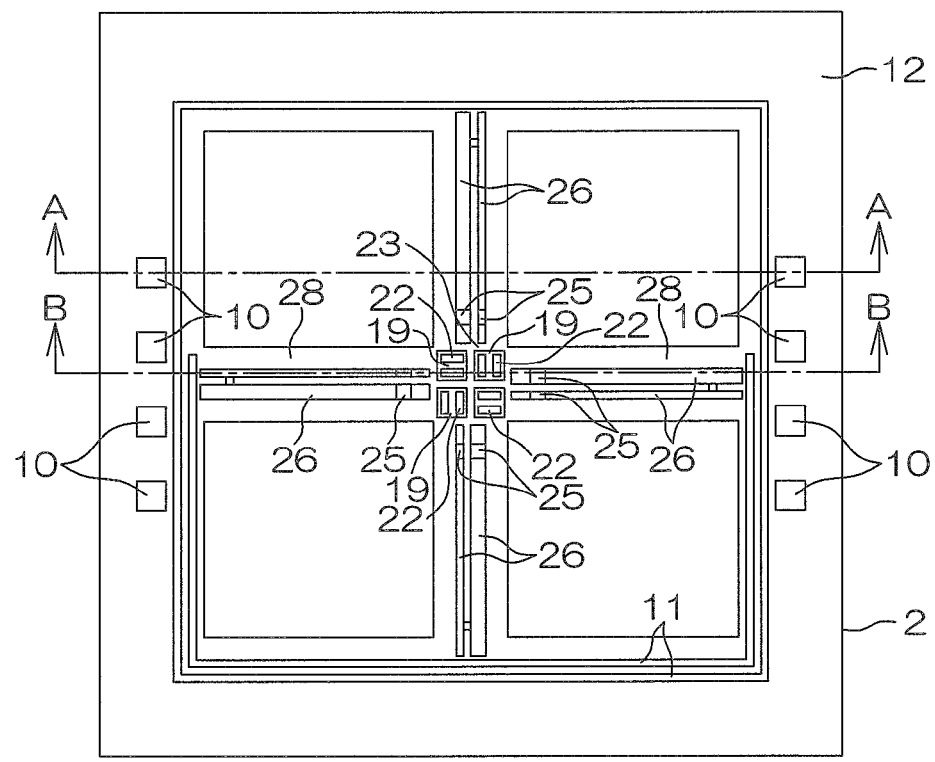
FIG. 5A is a schematic plan view showing a step subsequent to the step shown in FIG. 4A.
Figure 5B:
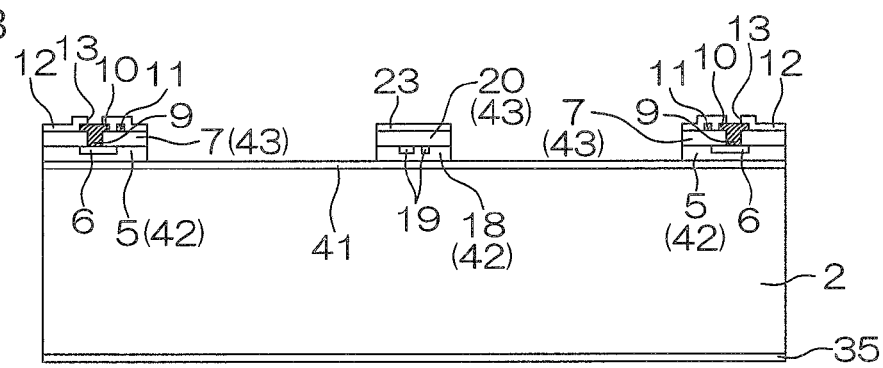
FIG. 5B is a schematic sectional view taken along a line A-A shown in FIG. 5A.
Figure 5C:
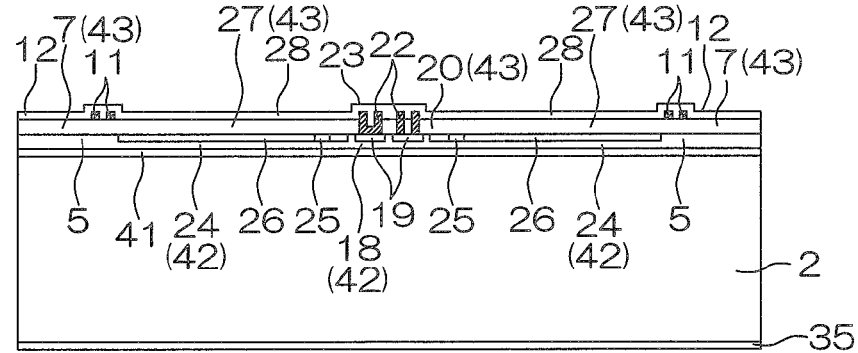
FIG. 5C is a schematic sectional view taken along a line B-B shown in FIG. 5A.

Then, a silicon nitride film (an SiN film) is formed on the silicon oxide film 43 by PECVD (Plasma Enhanced Chemical Vapor Deposition), as shown in FIGS. 5A, 5B and 5C. Then, the openings 13 are formed in the silicon nitride film by photolithography and etching. Thereafter the active layer 42, the silicon oxide film 43 and the silicon nitride film are selectively removed by photolithography an etching. Thus, the active layer 42 forms the semiconductor layers 5, 18 and 24, the silicon oxide film 43 forms the interlayer dielectric films 7, 20 and 27, and the silicon nitride film forms the passivation films 12, 23 and 28.

Figure 6A:
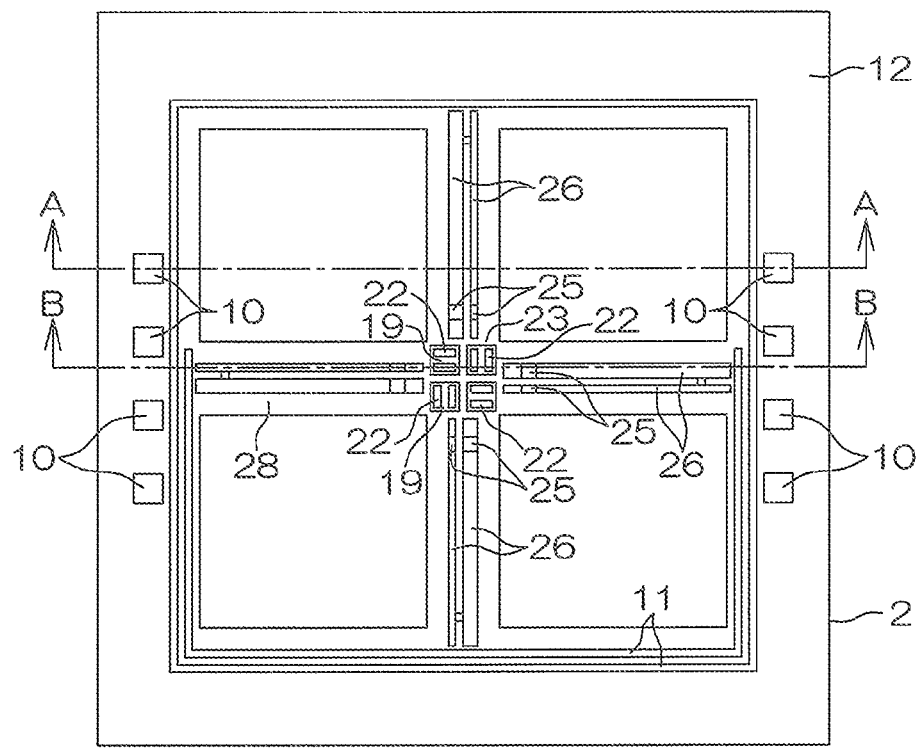
FIG. 6A is a schematic plan view showing a step subsequent to the step shown in FIG. 5A.
Figure 6B:
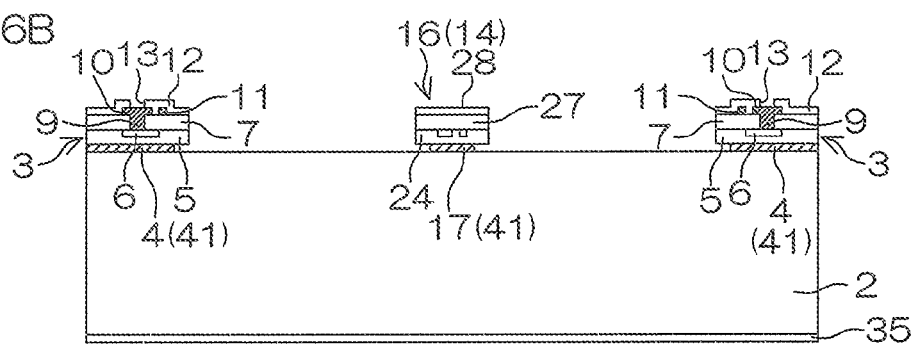
FIG. 6B is a schematic sectional view taken along a line A-A shown in FIG. 6A.
Figure 6C:
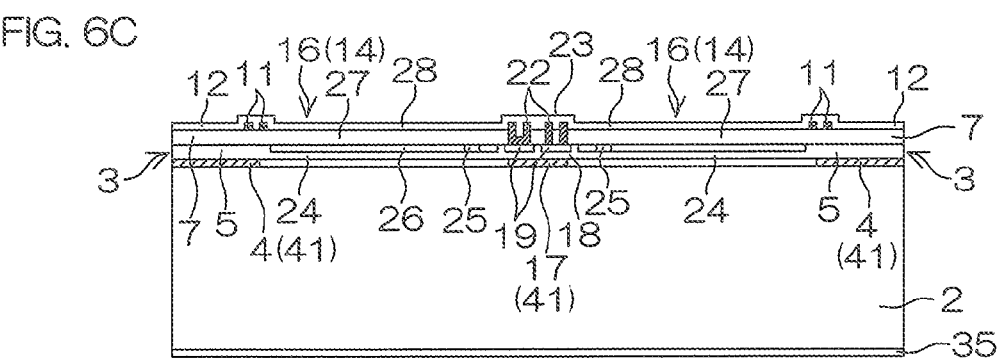
FIG. 6C is a schematic sectional view taken along a line B-B shown in FIG. 6A.

Thereafter exposed portions to the exterior and portions covered with the semiconductor layer 24 are removed from the BOX layer 41 by wet etching with HF (hydrofluoric acid), as shown in FIGS. 6A, 6B and 6C. Thus, the BOX layer 41 selectively remains only under the semiconductor layers 5 and 18, to form the insulating layers 4 and 17. Consequently, a structure based on the substrate 2 having the supporting portion 3 and the beam 14 formed thereon is obtained.

Figure 7A:
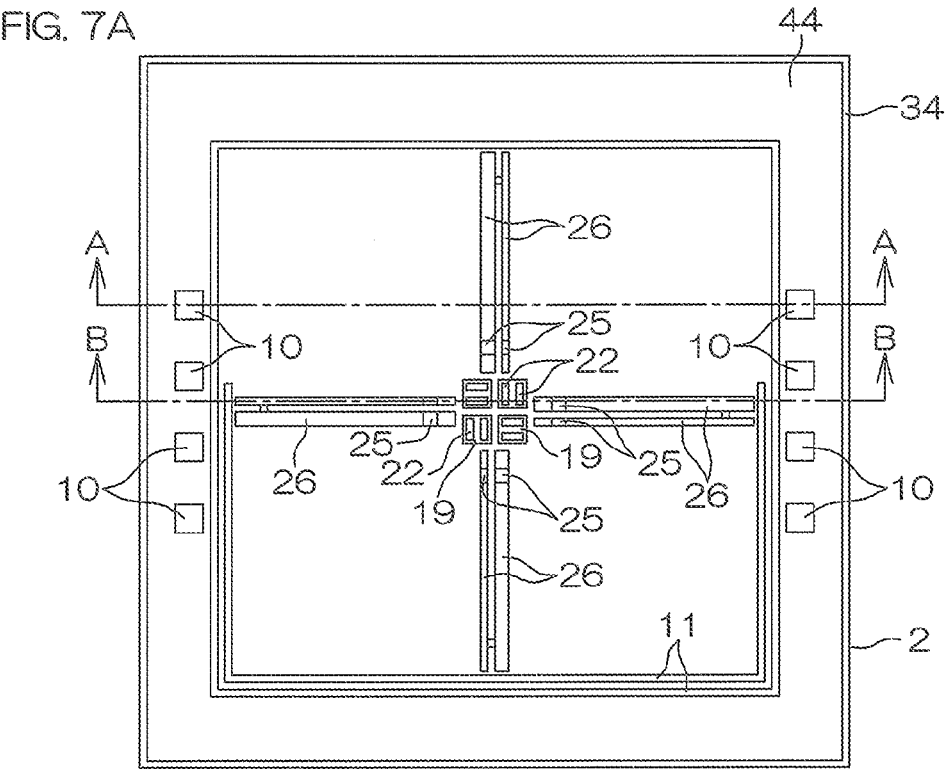
FIG. 7A is a schematic plan view showing a step subsequent to the step shown in FIG. 6A.
Figure 7B:
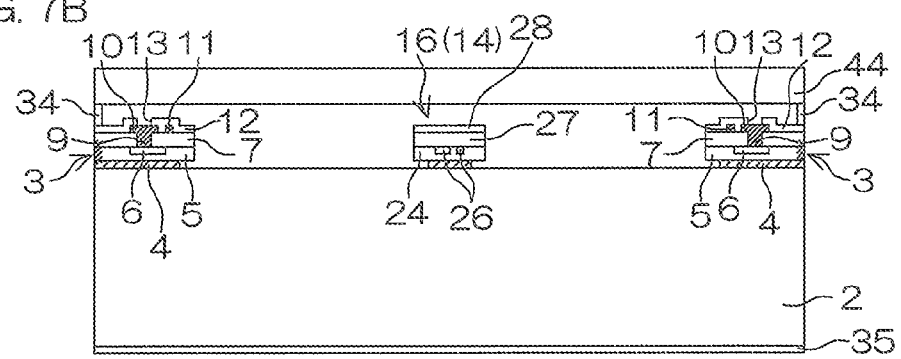
FIG. 7B is a schematic sectional view taken along a line A-A shown in FIG. 7A.
Figure 7C:
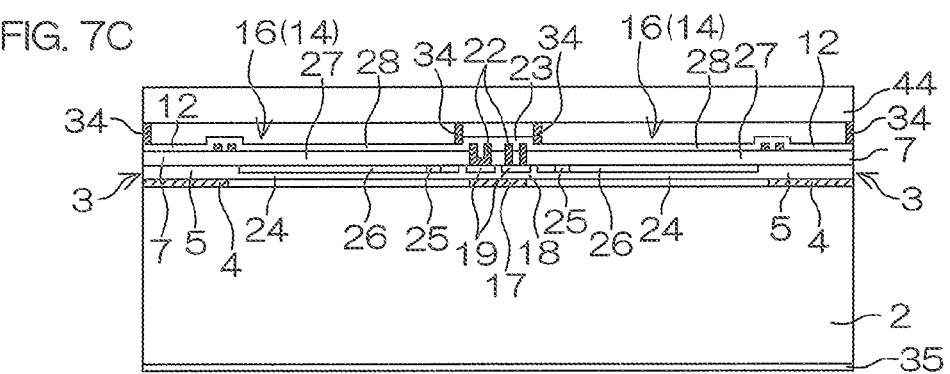
FIG. 7C is a schematic sectional view taken along a line B-B shown in FIG. 7A.

After the wet etching, the structure based on the substrate 2 and a silicon substrate 44 having a plane size identical to that of the substrate 2 are bonded to each other through the coupling portions 34, as shown in FIGS. 7A, 7B and 7C. More specifically, a bump in the form of a quadrilateral ring made of Au or Cu is formed on the outer peripheral edge of the supporting portion 3. Further, a bump in the form of a quadrilateral ring made of Au or Cu is formed on the cross portion 15 of the beam 14. On one surface of the silicon substrate 44, on the other hand, bumps in the form of quadrilateral rings made of Au or Cu are formed on positions corresponding to the bumps on the structure based on the substrate 2 respectively. The structure based on the substrate 2 and the silicon substrate 44 are registered with each other, and the bumps provided on the silicon substrate 44 are brought into contact with the bumps provided on the structure based on the substrate 2 respectively. At this time, a metallic material (solder, for example) containing Sn is interposed between the bumps brought into contact with one another as an adhesive. Thus, the coupling portions 34 made of the metallic material containing either Au or Cu and Sn are formed between the structure based on the substrate 2 and the silicon substrate 44. The structure based on the substrate 2 and the silicon substrate 44 are strongly coupled with each other due to eutectic bonding between Au or Cu and Sn on the interfaces between the bumps and the adhesive.

Thereafter the four through-grooves 30 are formed in the silicon substrate 44 by photolithography and etching. Thus, the silicon substrate 44 forms the weight structure 29, and the acceleration sensor 1 shown in FIGS. 1A, 1B and 1C is obtained.

Thus, the acceleration sensor 1 shown in FIGS. 1A, 1B and 1C can be obtained by forming the supporting portion 3 and the beam 14 on the substrate 2, thereafter bonding the silicon substrate 44 serving as the base of the weights 33 to the supporting portion 3 and the beam 14 through the coupling portions 34 made of the metallic material and working the silicon substrate 44 into the structure having the weights 33 by selective etching. In order to form the weights 33, therefore, no etching is required for forming surface-side grooves and rear-side grooves, dissimilarly to the steps of manufacturing a conventional acceleration sensor. Thus, the time required for manufacturing the acceleration sensor 1 can be reduced as compared with the conventional acceleration sensor.

Referring to FIGS. 2A, 3A, 4A, 5A, 6A and 7A, visually unrecognizable internal portions are shown through the uppermost layer if necessary.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2008-277134 filed with the Japan Patent Office on Oct. 28, 2008, the disclosure of which is incorporated herein by reference.

What is claimed is:

1. An MEMS sensor comprising:
   a substrate;
   a supporting portion provided on one surface of the substrate;
   a beam, supported by the supporting portion, having a movable portion opposed to the surface of the substrate through a space;
   a resistor formed on at least the movable portion of the beam;
   a weight arranged on a side of the beam opposite to the substrate; and
   a coupling portion, made of a metallic material, coupling the beam and the weight with each other,
   wherein the coupling portion is made of a material containing either Au or Cu and containing Sn, and
   wherein the coupling portion employs eutectic bonding.

2. The MEMS sensor according to claim 1, wherein the weight is made of Si.

3. The MEMS sensor according to claim 1, wherein the supporting portion includes an insulating layer formed on the surface of the substrate and a first semiconductor layer stacked on the insulating layer, and the movable portion includes a second semiconductor layer connected with the first semiconductor layer, the first and second semiconductor layers forming a single semiconductor layer.

4. The MEMS sensor according to claim 3, wherein a wire is formed on the second semiconductor layer by selectively doping the second semiconductor layer with an impurity, and the resistor is formed by doping an intermediate portion of the wire with the impurity in a lower concentration than the impurity concentration in the wire.

5. The MEMS sensor according to claim 1, wherein the supporting portion is in the form of a quadrilateral ring along the peripheral edge of the substrate in plan view, and the beam is arranged inside the supporting portion, to be cruciform in plan view.

* * * * *